US010102715B2

(12) United States Patent
Moshal

(10) Patent No.: US 10,102,715 B2
(45) Date of Patent: Oct. 16, 2018

(54) ONLINE, REAL-TIME GAME PLAYING WITH DISTRIBUTED BAD BEAT PROGRESSIVE JACKPOT

(71) Applicant: Cork Group Trading Ltd., Tortola (VG)

(72) Inventor: Martin Paul Moshal, Queens Way Quay (GI)

(73) Assignee: Cork Group Trading Ltd., Tortola (VG)

( * ) Notice: Subject to any disclaimer, the term of this patent is extended or adjusted under 35 U.S.C. 154(b) by 0 days.

(21) Appl. No.: 15/363,768

(22) Filed: Nov. 29, 2016

(65) Prior Publication Data

US 2017/0084123 A1 Mar. 23, 2017

Related U.S. Application Data

(63) Continuation of application No. 13/006,733, filed on Jan. 14, 2011.

(60) Provisional application No. 61/394,982, filed on Oct. 20, 2010.

(51) Int. Cl.
*A63F 13/00* (2014.01)
*G07F 17/32* (2006.01)

(52) U.S. Cl.
CPC ...... *G07F 17/3258* (2013.01); *G07F 17/3225* (2013.01); *G07F 17/3293* (2013.01); *A63F 2300/40* (2013.01); *A63F 2300/407* (2013.01); *A63F 2300/55* (2013.01)

(58) Field of Classification Search
CPC .. G07F 17/3293; G07F 17/32; G07F 17/3244; G07F 17/3272
See application file for complete search history.

(56) References Cited

U.S. PATENT DOCUMENTS 6,102,402 A 8/2000 Scott et al.
9,547,953 B2 1/2017 Moshal
(Continued)

FOREIGN PATENT DOCUMENTS

EP 2444135 4/2012
WO 2003/093921 11/2003

OTHER PUBLICATIONS

Canadian Intellectual Property Office, Application No. 2,755,177, Examiner's Report dated Nov. 1, 2013, 4 pages.
(Continued)

*Primary Examiner* — Omkar Deodhar
*Assistant Examiner* — Eric M Thomas
(74) *Attorney, Agent, or Firm* — McDonnell Boehnen Hulbert & Berghoff LLP

(57) ABSTRACT

Wagering methods, devices, and systems that allow individual participants in a game of poker to opt-in or opt-out of a bad beat feature are presented. For each hand played at a given table, a participant may activate the bad beat feature. Once the feature is activated, the participant is eligible for winning at least part of a bad beat progressive jackpot. This jackpot may be funded by tokens purchased by the participant, a rake taken from the hand's wagers, or by some other means. Apportionment of the bad beat progressive jackpot may be triggered by the participant losing the hand despite having cards that provide the participant with a significant likelihood of winning the hand.

20 Claims, 7 Drawing Sheets

(56) References Cited

U.S. PATENT DOCUMENTS

| | | | | |
|---|---|---|---|---|
| 2002/0169015 A1* | 11/2002 | Moody | G07F 17/32 463/13 |
| 2003/0114209 A1 | 6/2003 | Ritner et al. | |
| 2004/0150163 A1 | 8/2004 | Kenny et al. | |
| 2006/0025221 A1 | 2/2006 | Jain et al. | |
| 2006/0068899 A1 | 3/2006 | White et al. | |
| 2012/0071230 A1* | 3/2012 | Lagercrantz | G07F 17/32 463/22 |

OTHER PUBLICATIONS

Canadian Intellectual Property Office, Application No. 2,755,177, Examiner's Report dated Apr. 5, 2016, 5 pages.
Canadian Intellectual Property Office, Application No. 2,755,177, Examiner's Report dated Mar. 28, 2017, 5 pages.
Canadian Patent Application No. 2,755,177 office action and examination search report dated Apr. 17, 2018, 7 pages.

* cited by examiner

ONLINE, REAL-TIME GAME PLAYING WITH DISTRIBUTED BAD BEAT PROGRESSIVE JACKPOT

CROSS-REFERENCE TO RELATED APPLICATIONS

This application claims priority to U.S. patent application Ser. No. 13/006,733, filed Jan. 14, 2011, and hereby incorporated by reference in its entirety. U.S. patent application Ser. No. 13/006,733 claims priority to U.S. provisional patent application 61/394,982, filed Oct. 20, 2010, and also hereby incorporated by reference in its entirety.

BACKGROUND

A system and method for playing games, such as card games, over a computer network is described in published PCT application WO 03/093921 A2, published Nov. 13, 2003, which is assigned to the assignee of the present invention. The entire contents of WO 03/093921 A2 are incorporated by reference herein. The system of the '921 PCT publication includes a central gaming server accessible over the Internet and enables participation in games such as poker games by individuals accessing diverse portal websites (gaming websites).

In the last several years, systems have been commercialised such as that described in the '921 patent publication wherein a gaming website provides a facility for online game playing, particularly online poker playing. Such systems have become quite popular and gaming sites may host hundreds, even thousands of players at a time. In online poker, the success of an online poker website ("online poker room") is directly related to the magnitude of a pool of would-be players who desire to play a game of online poker. Simply put, the larger the pool of players, the more virtual poker tables (i.e. poker games each accommodating a maximum of, say, 10 players) the online poker software can spawn, thereby increasing the overall liquidity of the online poker room and increasing its attractiveness to other would-be players.

In order to maximise this size advantage, some online poker rooms operate under a centralised topology, in which there is a single operating entity ("operator") that owns and runs the gaming website and the player pool is homogeneous (i.e. all players are registered with, or "belong to", this single operator). The operator makes its money by charging a proportion (a "rake") of the collective wagers ("the pot") of all players participating in each game of poker that is played in the online poker room. Under a centralised topology, a player will always be playing only with other players who are registered with the same (i.e. the only) operator. Settlement of player wagers is straightforward: 1) the operator deducts it's rake from the pot; 2) the balance is paid over to the player that has won the game; and 3) the next game starts and the process repeats.

Other online poker rooms may operate under a distributed topology (also referred to, in the art, as a network topology). Under this topology, the player pool is heterogeneous, as players registered with different operators are pooled together to maximise liquidity of the collective player pool. This means that players registered with different operators could find themselves playing in the same poker game. In this instance, settlement of player wagers is more complex than in the centralised topology as situations invariably arise in which funds have to be transferred, (or "cleared"), between different operators whose players are playing on the poker network involving a multitude of operators. The principles underlying a distributed topology are set forth in the above-referenced patent application WO 03/093921 A2. The present inventive methods apply to both the centralised and distributed topologies.

FIG. 1 is a screenshot from an online poker room home or "lobby" page, showing a prior art arrangement for providing real-time game information to a potential game player. The player accesses the gaming website using a personal computer or other computing device with Internet access. As shown in FIG. 1, the lobby is presented on the user interface of the computing device. The lobby presents a display of eight categories or types of card games that are currently available for play via the website (either under a centralised or a distributed topology). Each game type is associated with a tab:

Tab 2: Omaha—poker games of the Omaha variety;

Tab 3: Omaha Hi/Lo—poker games of the Omaha Hi/Lo variety;

Tab 4: 7 Stud—poker games of the 7-card Stud variety;

Tab 5: 5 Stud—poker games of the 5-card Stud variety;

Tab 6: Private—invitation-only poker games established by players;

Tab 7: Sit & Go—non-scheduled tournaments; and

Tab 1: Hold'em—poker games of the Texas Hold'em variety;

Tab 8: MTT (Multi-Table Tournaments)—scheduled tournaments.

When any of the first five tabbed categories or types is selected, a player is presented with a list of all tables with poker games of that particular variation that are currently active. See FIG. 1, which shows the tables for the Hold'em game (tab 1). Via scroll bar 10 and slider 12, the player can scan the active game instances (virtual tables) in the list. For each active game instance, the following attributes are displayed:

- Name of the table (typically, fanciful names to spark player interest, but may also be in the form of a number or index).
- Table stakes in the format: Small Blind/Big Blind.
- Number of Participating Players/Maximum Number of Players that can be accommodated.
- Whether the table is a no limit table, a pot limit table or a fixed limit table.
- Average size of pots at that table.
- Average number of players who have not yet folded at the flop stage of the game.
- Number of players waiting to join the table.
- Number of hands played per hour.

Sit & Go tournaments (tab 7 of FIG. 1) are poker tournaments that have no pre-set start time, and commence when a prescribed number of players required for the tournament have entered the tournament. Sit & Go tournaments can be single-table or multi-table tournaments. When the Sit & Go tabbed category is selected, a player is presented with a list of all Sit & Go tournaments that are either active or are pending. For each Sit & Go tournament in the list, the following attributes are displayed:

- A tournament identification code.
- A name of the tournament.
- A type of poker game played in the tournament.
- Whether the tournament is a no limit, pot limit or fixed limit tournament.
- The number of seats that are available in the tournament.
- The current size of blinds for active tournaments, and the number of players already entered for pending tournaments.

MTT (tab 8 of FIG. 1) are poker tournaments that have a scheduled start time. Players are required to enter the tournament and to be available to commence play in time for the scheduled start of the tournament. When the MTT tabbed category is selected, a player is presented with a list of all MTT tournaments (same instances) that are either active or are pending. For each MTT tournament in the list, the following attributes are displayed:

A tournament identification code.

A name of the tournament.

A type of poker game played in the tournament.

Buy-in rules.

The number of entrants for the tournament.

A current size of blinds for active tournaments and a scheduled start time for pending tournaments.

The game of poker is popular and is widely played in many jurisdictions, particularly in the United States of America. A traditional game of poker is a multiplayer game, generally accommodating a minimum of 4 and a maximum of between 8 and 10 players. In a turn of the game, a winner of the game is the player who obtains a highest-ranking poker hand of five cards. For a standard deck of 52 playing cards, the poker hands are, in order of increasing rank: a pair of cards having the same rank ("one pair"); two pairs of cards in which the rank of each pair is different ("two pairs"); three cards each having the same rank ("three of a kind"); a "straight" in which the five cards of a hand are in sequentially increasing rank order, with no restriction on suite; a "flush" in which the five cards are all of the same suite; a "full house" in which three cards are each of the same rank, while the remaining two cards each have another identical rank; "four of a kind" in which four cards of the hand each have the same rank; a "straight flush" in which the five cards are in sequentially ascending rank order and are all of the same suite; and a "Royal Flush" in which the five cards are all of the same suite and are ranked Ace, King, Queen, Jack and 10. Where a deck is used that has fewer than 52 cards, the probability of obtaining a full house is greater than the probability of obtaining a flush, making the latter combination of cards more desirable, and therefore of higher rank, than the former.

Poker hands with a ranking of Four of a Kind and Straight Flush are very strong hands and are usually sufficient to win the game. It is possible, though, that a player may obtain such a hand and yet still not win the game, being beaten by another player who holds a higher ranking poker hand. Such an occurrence, in which a very good poker hand loses to an even better one, is termed a "Bad Beat". For example, a player who has a Four of a Kind with four Kings loses to another player who has a Four of a Kind containing four Aces.

It is customary for poker rooms to offer a jackpot prize that is won upon the occurrence of a Bad Beat. When a Bad Beat event occurs, the losing player of the poker hand is awarded 50% of the jackpot prize, the winner of the poker hand is awarded 25% of the jackpot prize and the remaining 25% of the jackpot prize is distributed equally among the remaining players who participated in the hand. Different poker rooms may have different levels of payouts for Bad Beat jackpots and have different losing hand requirements. For example, bad beat jackpot winners must lose with a hand of Four of a Kind Eights or better in order to qualify for the jackpot or, alternatively, the winners must lose with a hand containing Four of a Kind Jacks or better.

The operator of the poker room provides the Bad Beat jackpot prize. The Bad Beat jackpot prize can be a fixed prize or can be progressive in nature. In the former instance, the fixed prize that is provided by the operator should be of a magnitude sufficient to stimulate player interest. Where the Bad Beat jackpot prize is progressive, the jackpot may be funded by means of a portion of the operator rake on the pot of each game. This method of funding the Bad Beat progressive jackpot prize may cause the jackpot to increase to a size that attracts additional players to participate in the poker game.

Players who desire to be eligible for a Bad Beat jackpot prize, whether progressive or static, must play at dedicated Bad Beat tables or poker games. More particularly, in land-based poker rooms, there is usually one or more dedicated Bad Beat tables at which all players seated at such tables are eligible for the Bad Beat jackpot prize. A disadvantage of such an arrangement is that it lacks flexibility as it is difficult or impossible to establish additional Bad Beat tables during periods of high player demand, whereas in periods of low player demand the dedicated Bad Beat tables may be sparsely populated. In an online environment, a number of virtual poker tables spawned by the online poker software are designated as dedicated Bad Beat tables and all players playing at these dedicated tables automatically play for the Bad Beat the jackpot prize. In this instance, dedicated Bad Beat virtual poker tables may be spawned or collapsed in accordance with the varying player demand, but such decisions usually require manual intervention.

The net result of the situation is that Bad Beat games and players and non-Bad Beat games and players are physically or logically separated in real and virtual poker games, respectively. Further, it is not possible for a player to switch from being eligible for a Bad Beat jackpot prize to not being eligible for the Bad Beat jackpot prize, and vice versa, without changing the real or virtual poker table at which the player is seated.

SUMMARY

This disclosure relates generally to methods and systems for providing online, real-time game playing over computer networks such as the internet. Moreover, this disclosure relates to methods for enabling a multitude of players to participate in a multiplayer game having a progressive jackpot prize. Aspects of this invention allow a gaming server coordinating online game playing to enable real-time progressive game play in which a number of game players (e.g., many thousands of such players) participate in an online progressive jackpot game.

In particular, the embodiments herein relate to a methods, devices, and systems that allow individual players to opt-in to a bad beat progressive jackpot. Apportionment of the bad beat progressive jackpot may be triggered by a participant in the hand losing the hand despite having cards that provide the participant with a significant likelihood of winning the hand.

Thus, in an example embodiment, a server device may initiate a hand of poker with a client device. A bad beat feature may be activated for the client device, but the bad beat feature might not be activated for at least one entity that participates in the hand. In response to the bad beat feature being activated for at least the client device, the server device may increment a bad beat progressive jackpot. Then, in response to completion of the hand, the server device may transmit an indication of an outcome of the hand to the client device.

In another example embodiment, a server device may initiate a hand of poker between a plurality of client devices, wherein each client device individually chooses to opt-in to a bad beat feature. In response to the bad beat feature being opted into by the client devices, the server device may increment a bad beat progressive jackpot. Then, in response to completion of the hand, the server device may transmit an indication of an outcome of the hand to each of the client devices.

In a further example embodiment, a data processing apparatus, configured as a server, may execute instructions of a computer program so as to host a poker game in which sums are wagered on the outcomes of events by a user. If a wager is successful, there is a payout for the benefit of the user. The data processing apparatus may be in data communication with a user device which is operated by the user to wager the sums on the outcomes of the events. The data processing apparatus may also store an account for the user, the outcome from successful wagers being credited to the user account as credit.

The data processing apparatus may also be configured to allow a bad beat feature to be activated for the user during a hand of the poker game. However, the bad beat feature might not be activated for at least one entity that participates in the hand. Apportionment of a bad beat progressive jackpot may be triggered by a participant in the hand losing the hand despite having cards that provide the participant with a significant likelihood of winning the hand. The bad beat progressive jackpot may incremented based on the bad beat feature being activated for at least the user.

Additionally, the data processing apparatus may be configured to pay out at least part of the bad beat progressive jackpot to the user by incrementing the credit in the user account, if apportionment of the bad beat progressive jackpot is triggered.

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements. Moreover, the principles of the present invention are applicable to both a centralised gaming topology where all players are registered with a single operator, as well as to a distributed topology as described above.

BRIEF DESCRIPTION OF THE DRAWINGS

Exemplary embodiments are illustrated in reference figures of the drawings. It is intended that the embodiments and figures disclosed herein are to be considered illustrative rather than restrictive.

FIG. 2 is a schematic diagram of a system for providing game playing for a plurality of distributed computing devices, in which a central server provides lobby page data to the distributed computing devices using the techniques of this disclosure. While FIG. 2 shows a distributed network topology, the principles of this disclosure are applicable in a centralised topology.

DETAILED DESCRIPTION

1. Overview

It is desirable to enable poker players who wish to be eligible for a Bad Beat jackpot to play in the same real or virtual poker game as other players who do not wish to be eligible for the Bad Beat jackpot. It is also desirable for any such player to be able to switch, at will, between a state in which the player is eligible for the Bad Beat jackpot and a state in which the player is not eligible for the Bad Beat jackpot. It is further desirable to fund Bad Beat progressive jackpots in a new manner. Having made this insight, the present disclosure provides for new methods of enabling players participating in poker games to become eligible for Bad Beat jackpot prizes that overcomes this problem, and new methods of funding Bad Beat progressive jackpot prizes, far surpassing the ability of the prior art to do so.

Before describing the preferred embodiments in greater detail, an explanation will be provided first of a computer-based system for online game playing in which multiple distributed computing devices engage in playing of card games using a central server, and, in particular, wager games such as poker. The following description is offered by way of illustration, and not limitation, of one possible environment in which the invention can be practised.

Figure 1:
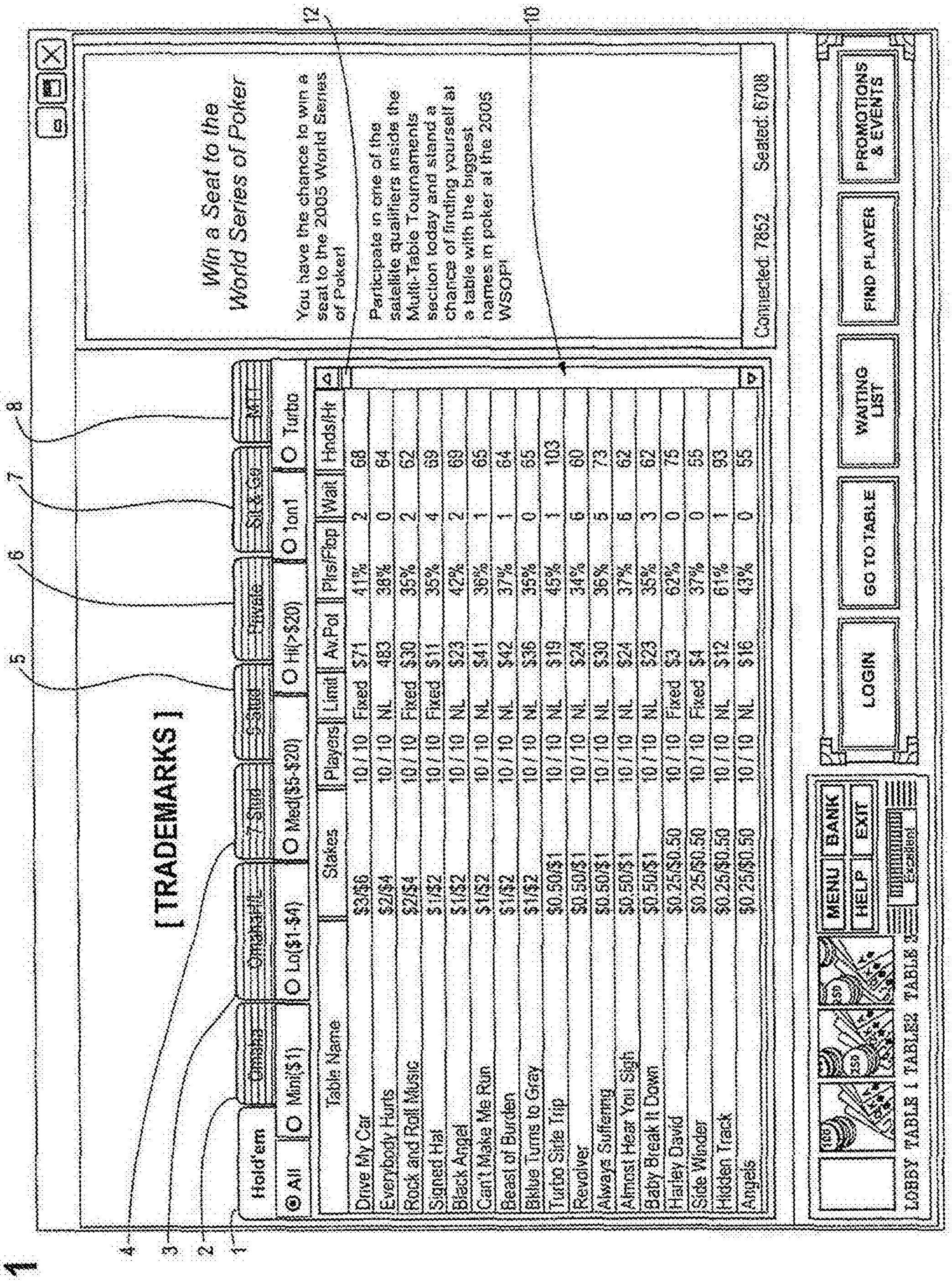
FIG. 1 is a prior art lobby page displayed on a workstation by a client application providing for game playing over a computer network, the lobby page including a plurality of tabs corresponding to particular game types and under each tab a display of a plurality of instances of games of the selected game type.
Figure 2:
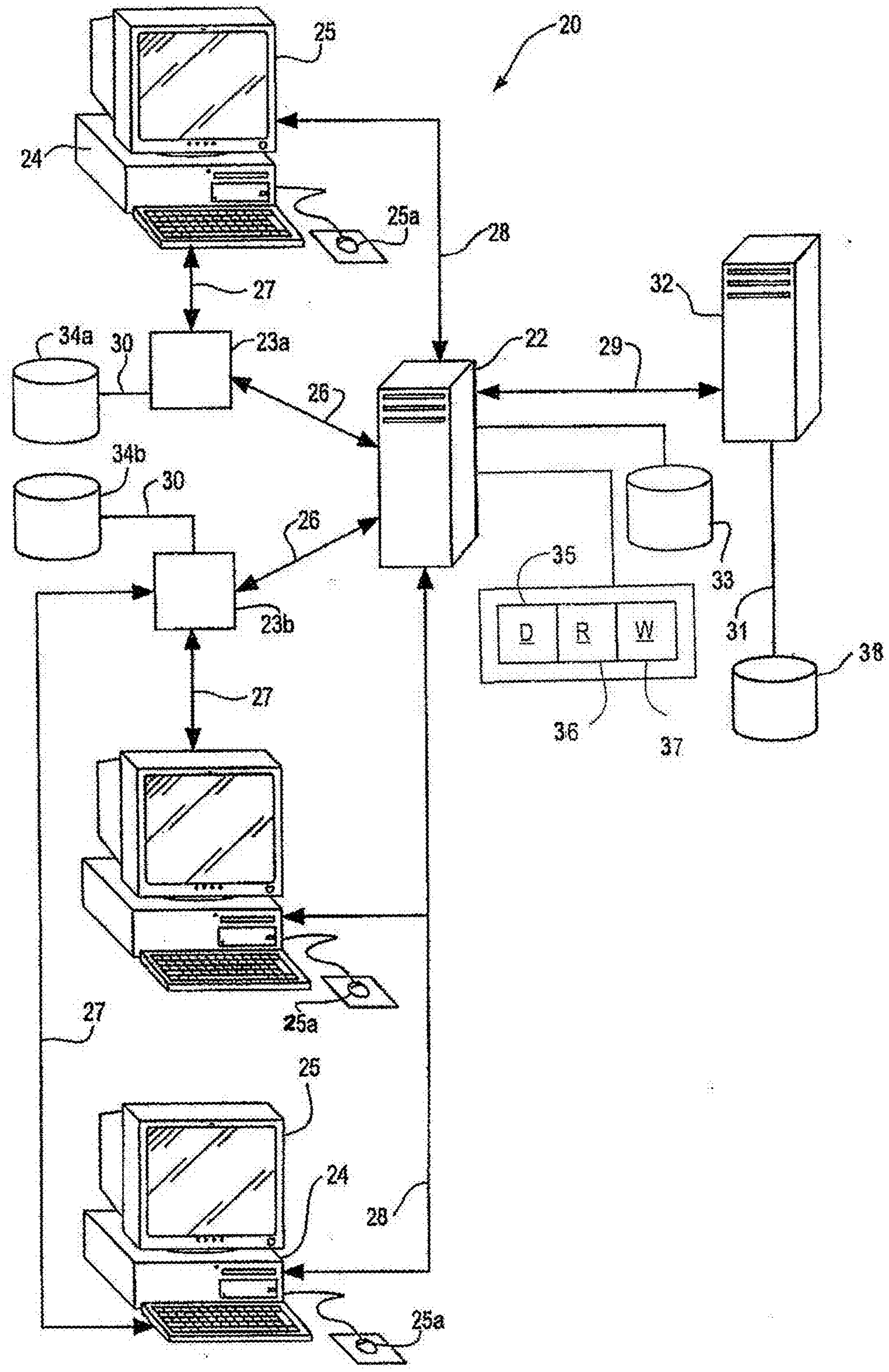

Referring to FIG. 2, a system for playing a game of multiplayer poker is indicated generally by reference numeral 20. The system 20 includes a central gaming server 22, and a number of portals 23*a*, 23*b* in the form of portal websites on the World Wide Web of the Internet. In this embodiment, each one of the portal websites is an online casino website hosted on a corresponding casino web server (not shown). Each one of the casino websites 23*a*, 23*b* is accessible by a would-be poker player (not shown) through a user access facility 24 in the form of a computing device such as an Internet-enabled computer workstation having a display 25 and an associated pointing device 25*a*, such as a mouse or, alternatively, a touchpad. In this embodiment, the online casino website 23*a* is shown as having one computing workstation 24 logically connected thereto, whereas casino website 23*b* is shown as being logically connected to two computer workstations 24. It will be appreciated by those skilled in the art that such an online casino website 23*a*, 23*b* can be logically connected to any desired number of such computer workstations 24 simultaneously, which number is physically limited primarily by considerations of processing power, website hardware, and Internet access bandwidth.

The gaming server 22 includes a processing unit (such as a central processing unit, not shown) and a database 33 coupled to the processing unit that stores game information data for a plurality of instances of games played by the computer workstation 24. The database 33 is updated continuously to store real-time or near real-time information as to the plurality of instances of games, such as the name of each instance (e.g., table name), the players at each table, the stakes, available seats, waiting time, etc. The gaming server 22 provides the game information data (lobby pages) to the computer workstations 24, in the form of pages.

The system 20 includes, further, an administration facility 32 in the form of an application server, which is communicable with the gaming server 22 along a communication network 29. Although the operation of the application server 32 will be outlined briefly in the description that follows, further details are not particularly pertinent to the present discussion and the reader is directed to the published '932 PCT application cited above for further reference.

The gaming server 22, the online casino web servers (not shown) corresponding to the online casino websites 23*a*, 23*b*, the computer workstations 24 and the application server 32 are capable of communicating with each other by means of an open communication channel that is, in this embodiment, the Internet. The Internet is represented in FIG. 2 as separate logical communication networks 26, 27, 28, 29, 30 and 31.

The gaming server 22 operates under control of a server-stored program (not shown) capable of enabling a predetermined maximum number, say 8 or 10, of players to play an instance of the game of multiplayer poker. Each instance of the game may take the form of a virtual card table playing a particular game (e.g. Hold'em) or virtual game tournament, such as a virtual poker tournament. When the number of players for a given instance of a game reaches this predetermined maximum number, the server-stored program causes a further instance of the game to be initiated (e.g. a new virtual poker table), the new instance of the game also being capable of accommodating a further 8 or 10 players. In this manner the gaming server is capable, under server-stored program control, to spawn as many separate instances of the game of multiplayer poker as required in order to accommodate a pool of players who desire to play the game, in groups of a maximum of, for example, 10. Each instance of the game spawned in this manner is treated as totally independent of the other instances.

Figure 3:
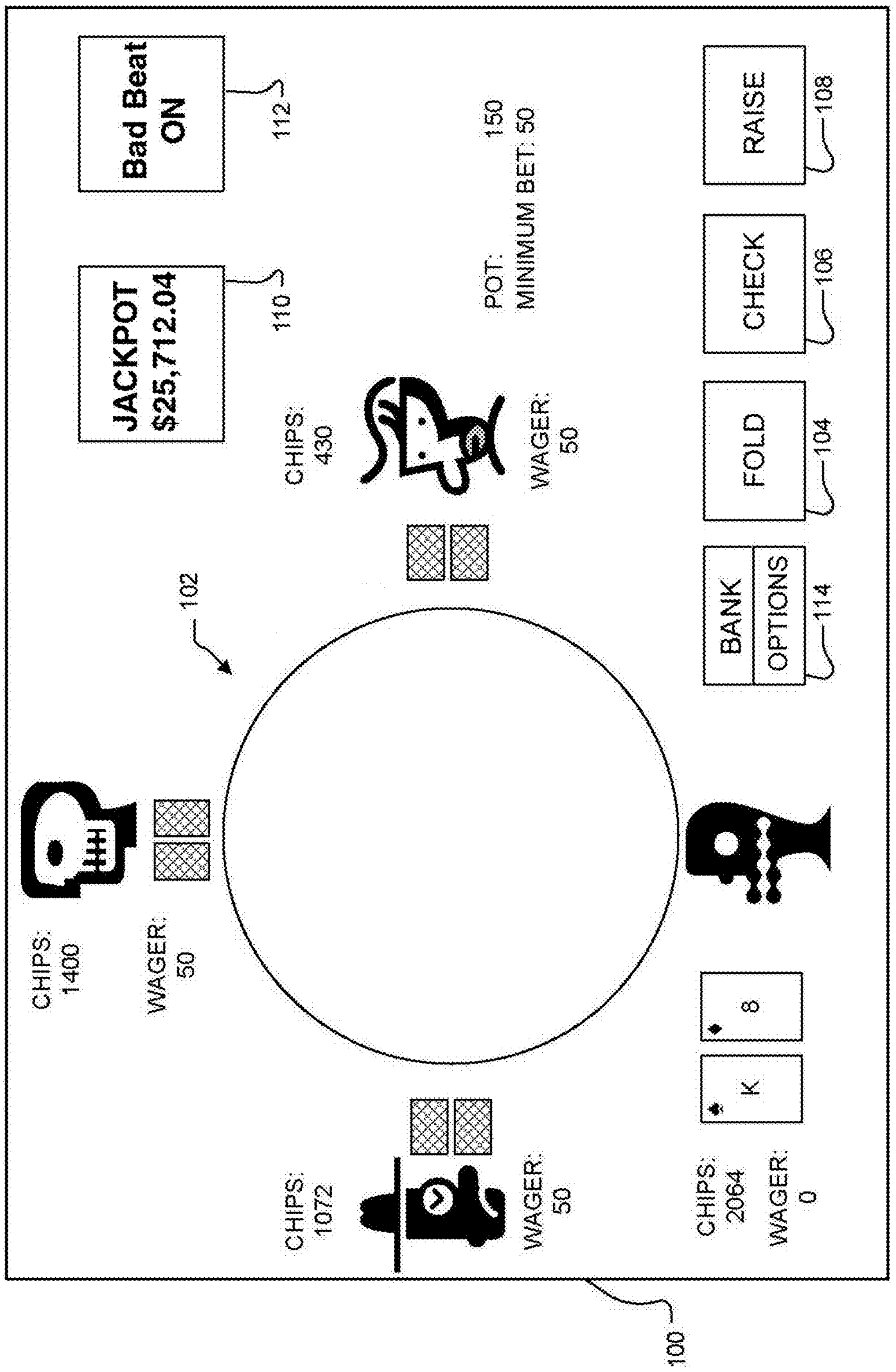
FIG. 3 is a graphical user interface (GUI) for effecting game playing on a distributed computing device connected to a computer network. The GUI shows a mechanism that enables a player to set the player's eligibility for a Bad Beat progressive jackpot prize.

The online casino websites 23*a*, 23*b* enable a player who desires to join the game of multiplayer poker to request, by means of one of the computer workstations 24, participation in the game and, once admitted to an instance of the game, to place a wager on a turn of that instance of the game. During play, each participating player is presented with an identical graphical user interface (GUI) 100 on his respective computer workstation 24 by a separate, locally stored, program in the computing device, as shown in FIG. 3. The GUI 100 presents to the player a suitable display of a poker game 102 with appropriate activatable icons 104, 106, 108, and 114 that enable the player to make his own desired game play decisions and to monitor the progress of the multiplayer game by viewing the game play decisions of the other participating players in the same instance of the game. The manner in which a participating player uses the GUI 100 to play the game of multiplayer poker is not important and will not be described here in detail.

The server-stored program also provides a wagering means 37 in the form of computer instructions operable by any participating player to place a wager on the turn of the game, as well as a discrimination means in the form of computer instructions 35 capable of determining whether any wager placed by any one of the participating players on the turn of the instance of the game of multiplayer poker is successful or unsuccessful. The stored program in the gaming server 22 also maintains a dynamic register 36 of all players admitted to, and actively participating in, all the spawned instances of the poker game from time to time, together with data representative of a corresponding portal 23*a*, 23*b* through which each participating player accessed the game. The dynamic register 36 also contains data representative of an instance of the game in which the player is participating. The application server 32 also settles the wagers of the participating players after the completion of every turn of any instance of the game.

The computer workstations 24 may take the form of conventional personal computers operating under a Windows, Linux or Macintosh operating system, provisioned with a web browser and a connection to the Internet. The computer workstations 24 may also take the form of portable, hand-held computing devices with a web browser and wireless Internet access. The gaming server 22 may also operate under a Windows NT or other conventional operating system.

The game of multiplayer poker using a computing device or computer workstation 24 is facilitated by means of a workstation-stored program (not shown) referred to, for convenience, as a client process that is executable on a computer workstation 24, and a corresponding server-stored program (not shown), or server process, that is executable on the gaming server 22. The server process (not shown) generates one or more random events that affect the outcome of the game of poker, such as the dealing of cards to participating players. The client process (not shown) obtains the result of the random events from the gaming server 22, across the communication network 28 and displays the outcome of the game on the display monitor 25 in an intelligible manner.

In order to play multiplayer poker or other games from any computer workstation 24, the client process (not shown) must first be downloaded, e.g. from the gaming server 22 (or from the website 23*a* or 23*b*) to that computer workstation. Such download will typically occur when the computer workstation 24 first accesses the homepage of the website 23*a* or 23*b*, and the user is presented with a message asking the user whether they wish to download the client process in order to play the game. The user selects a "Yes" icon and the download then proceeds. The client process is then launched and communication between the computer workstation 24 and the gaming server 22 then proceeds. In a distributed topology scenario, a player wishing to participate in the multiplayer games such as poker uses a computer workstation 24 to access an online casino website 23*a*, 23*b* of his choice, but regardless of the choice of website the user is presented with the same underlying client process. The client process will typically have different trademarks, colour schemes, or "look and feel" depending on which online casino website from which the user downloaded the client process.

2. Bad Beat Progressive Jackpot

The GUI 100 of FIG. 3 includes a counter 110 that displays a running Bad Beat progressive jackpot prize for which any player participating in any instance of the game of multiplayer poker may be eligible. The Bad Beat progressive jackpot prize increments as a function of the number of players who actively compete for the Bad Beat jackpot, until the progressive jackpot prize is won, whereupon the Bad Beat progressive jackpot prize is re-set to a lesser amount and increments again as previously described.

The GUI 100 includes a further icon 112 that toggles between a "BAD BEAT ON" state and a "BAD BEAT OFF" state. When the icon 112 is in the BAD BEAT OFF state, the player participates in the instance of the multiplayer poker game, but is not eligible to receive any portion of the Bad Beat progressive jackpot 110 should a Bad Beat event occur in the instance of the of the game of the multiplayer poker game in which the player is participating. When the icon 112 is in the BAD BEAT ON state, the player participates in the instance of the multiplayer poker game and is, simultaneously, eligible to receive a portion of the Bad Beat progressive jackpot if a Bad Beat event occurs in the instance of the game.

When a Bad Beat event occurs in an instance of the game, the Bad Beat progressive jackpot prize is apportioned to the players who participated in the instance of the multiplayer poker game in which the Bad Beat event occurred, according to the following rules:

50% of the progressive jackpot prize to the participating player with the losing hand, i.e., the Bad Beat, in the turn of the poker game in which the Bad Beat event occurred.

25% of the progressive jackpot prize is awarded to the participating player with the winning hand in the turn of the poker game in which the Bad Beat event occurred.

25% of the progressive jackpot prize in equal measure to the remaining players who actively participated in the turn of the poker game in which the Bad Beat event occurred.

Any participating player whose Bad Beat icon 112 was not in the BAD BEAT ON state when the Bad Beat event occurred does not receive the player's apportioned share of the BAD BEAT progressive jackpot. That portion of the progressive jackpot prize to which the participating player would have been entitled had the player's Bad Beat icon 112 been in the BAD BEAT ON state remains undistributed.

The Bad Beat progressive jackpot prize will never be less than a predetermined base amount.

3. Bad Beat Jackpot Participation

Figure 4:
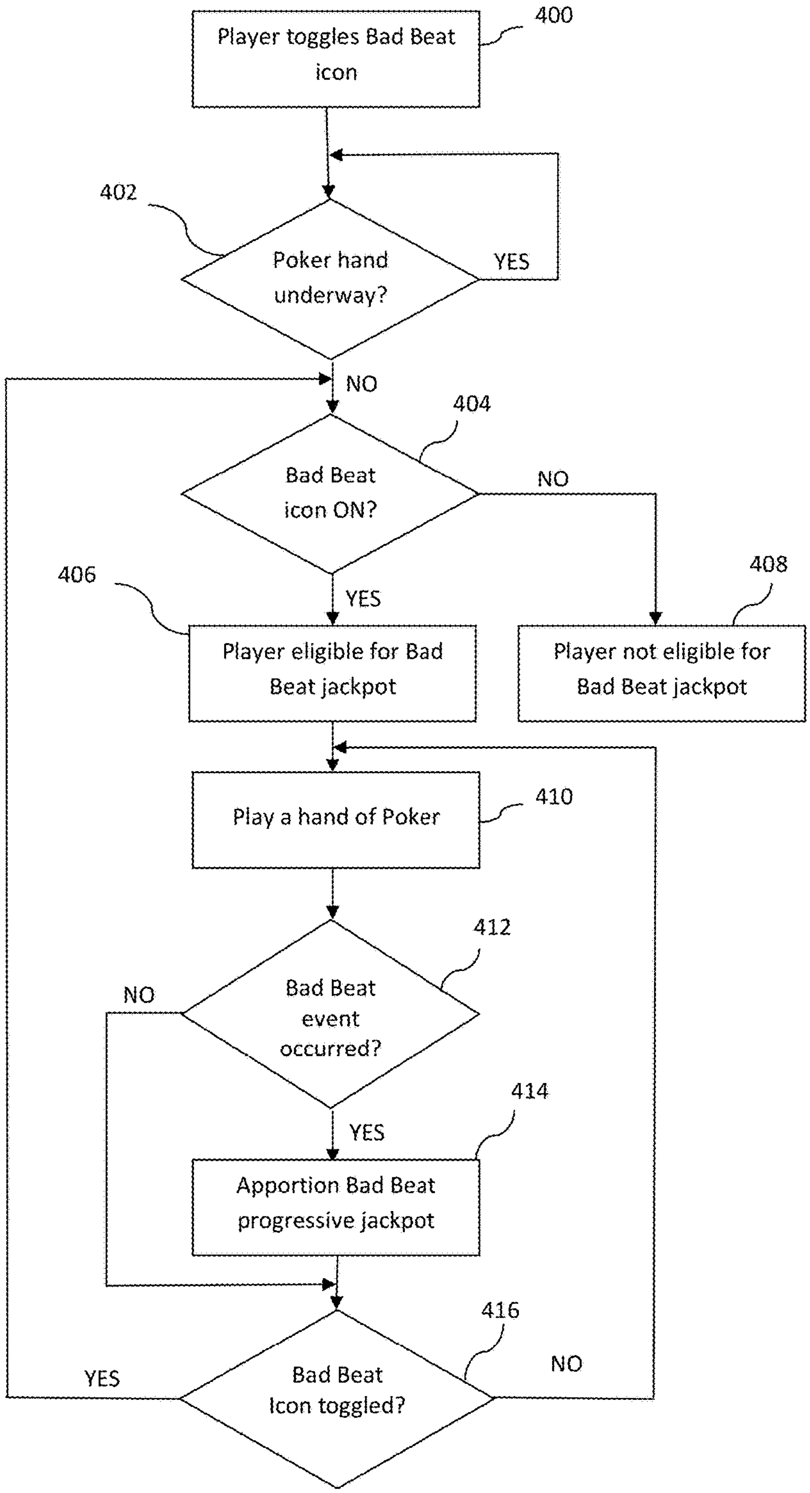
FIG. 4 is a flow chart illustrating the steps that determine a player's eligibility to win a share of the Bad Beat progressive jackpot.

FIG. 4 is a flow chart illustrating the various steps of a player's eligibility for, and participation in, the Bad Beat progressive jackpot prize. A participating player in any instance of the multiplayer poker game utilises the GUI 100 to effect any playing decisions required during the game, as described above. The player toggles icon 112 on the GUI 100 to the BAD BEAT ON state in order to become eligible for the Bad Beat progressive jackpot as indicated at step 400 of FIG. 4.

Whenever the player toggles the state of the Bad Beat icon 112, the new state reflecting the player's new status of eligibility or non-eligibility for the Bad Beat progressive jackpot, as the case may be, comes into effect only upon completion of the hand of poker that the player is playing, as indicated in steps 402, 404, 406 and 408. Thus the poker hand in play when the icon 112 is toggled is completed with the same player Bad Beat state that obtained at the commencement of the poker hand.

It is open to any player that is participating in any instance of the game of multiplayer poker, at any time, to elect to be eligible for the Bad Beat progressive jackpot by toggling icon 112 of the player's GUI 100 to the BAD BEAT ON state. During a play of a subsequent hand of poker 410, if a Bad beat event occurs 412, the Bad Beat progressive jackpot is apportioned 416. Then, depending on whether the icon 112 is toggled 416, a further hand of poker may or may not be eligible for the Bad Beat progressive jackpot.

It is anticipated that any instance of the game of multiplayer poker may, at any time, have some participating players that have made themselves eligible for the Bad Beat progressive jackpot and other participating players who have elected not to do so. Furthermore, a Bad Beat event may occur in any instance of the multiplayer poker game, not just in an instance of the multiplayer poker game that has been designated as a dedicated Bad Beat table. All players in all instances of the multiplayer poker game whose Bad Beat icon 112 is in the BAD BEAT ON state are simultaneously eligible for the same Bad Beat jackpot. The use of an individual Bad Beat icon 112 for each player enables players who are eligible for the Bad Beat progressive jackpot to be seated at a virtual poker table with other players who are not eligible for the Bad Beat progressive jackpot, thus removing the prior art restriction of having predefined dedicated Bad Beat virtual poker tables or game instances. Every player in every instance of the multiplayer poker game (i.e. every virtual poker table) can be eligible for the Bad Beat progressive jackpot without having to join an instance of the multiplayer game that is restricted to Bad Beat players only.

4. Funding of the Bad Beat Progressive Jackpot

Embodiments will now be described for funding the Bad Beat progressive jackpot without requiring dedicated Bad Beat tables to be set up. The application server 32 provides a clearing account facility 38 (e.g. a database) that has a clearing account corresponding to each one of the online casino websites 23*a*, 23*b*, as illustrated in FIG. 2. Analogously, each online casino website 23*a*, 23*b* includes a corresponding credit account facility 34*a*, 34*b* with a credit account corresponding to each player who participates in the game of multiplayer poker through a computer workstation 24 logically connected to that casino website. In the illustrated embodiment, therefore, the credit account facility 34*a* has one player credit account associated with it, while credit account facility 34*b* has two associated player credit accounts. Each player credit account has two account balances, namely a credit balance and a Bad Beat token balance. The application server 32 also provides a Bad Beat accumulation account, the balance of which is the Bad Beat progressive jackpot prize that is displayed by counter 110 in the GUI 100 of FIG. 3. The manner by which accounts are cleared among the operators of the websites 23*a*, 23*b* is not particularly important and is described in the aforementioned published '921 PCT application.

Wagers made by players participating in a game of multiplayer poker are made with credit purchased by each individual player prior to or during participation in the game. The player may purchase credit by means of conventional credit or debit cards or by means of other payment mechanisms that are well known in the art and which will not be described here in detail. Whenever a player purchases credit in this manner, the player's corresponding online casino 3*a*, 3*b* credits the player's credit account with an amount equivalent to the quantity of credit purchased.

Figure 5:
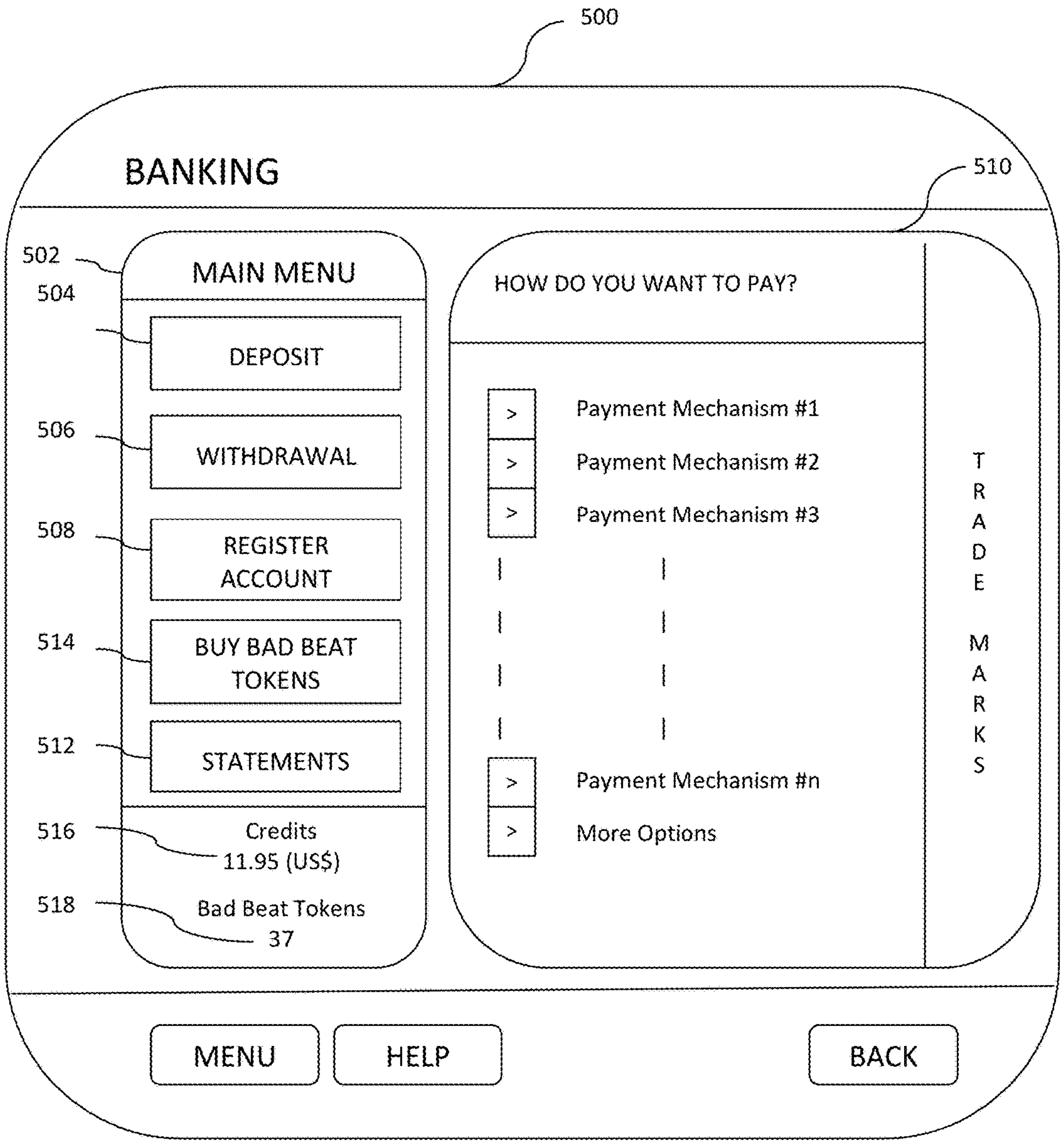
FIG. 5 is a schematic diagram of a banking interface that enables a player to manage the player's credit account. The banking interface page allows the player to acquire tokens necessary for participation in the Bad Beat progressive jackpot.

A player may purchase credit by activating an icon labelled "BANK" on the lobby page of the online poker room, whereupon the client process (not shown) displays a banking screen 500 that enables the player to manage the player's credit account, as illustrated in FIG. 5. The banking screen 500 consists of a main menu 502 having a number of selection icons 504, 506, 508 and a secondary display pane 510 on which the player may make additional choices where necessary. Icons 504 and 506 on the main menu 502 of the banking screen 500 permit the player to deposit and to withdraw credit from the player's own credit account. Icon 508 enables a new player at an online casino 23*a*, 23*b* to establish a player credit account, while the player can use icon 512 on the main menu 502 to obtain statements relating to the player's credit and Bad Beat token account balances.

The player is able to purchase a desired number of Bad Beat tokens by activating icon 514 labelled "Buy Bad Beat Tokens" on the main menu 502 of the banking screen of FIG. 4. The Bad Beat tokens have a predetermined unit price, US$0.25 for example, and enable the player to be eligible for the Bad Beat progressive jackpot while participating in a game of online poker, as will be described below. The player may make payment for the Bad Beat tokens by selecting a particular payment mechanism from the secondary display pane 510 of the banking screen 500. Whenever a player purchases Bad Beat tokens in this manner, the player's corresponding online casino 23*a*, 23*b* increments the Bad Beat token balance of that player's credit account by the number of Bad Beat tokens purchased by the player. The banking screen 500 displays the credit and Bad Beat token balances 516, 518 of the player's credit account on the banking screen 500.

Figure 6:
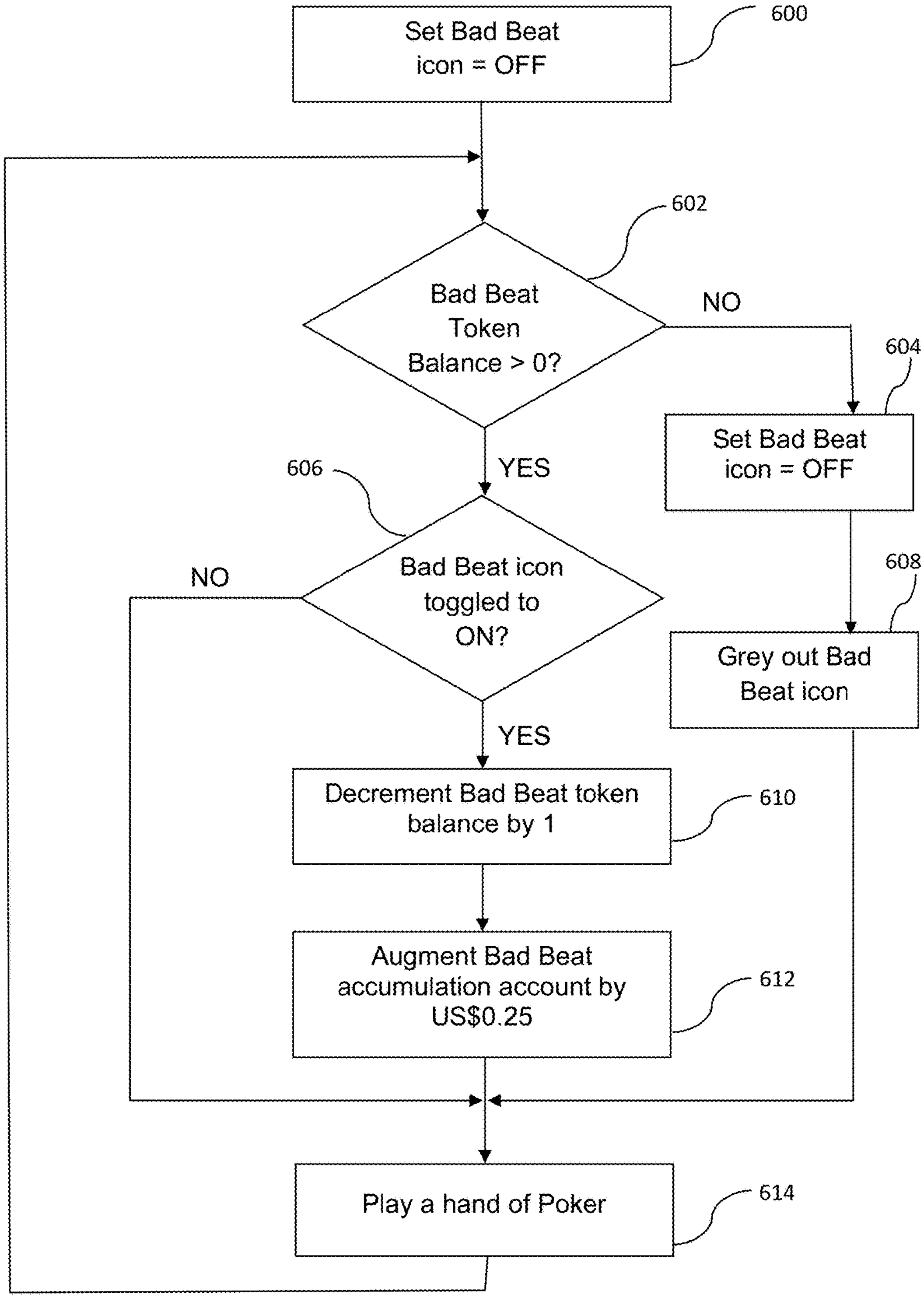
FIG. 6 is a flow chart of the steps involved in a first method of funding the Bad Beat progressive jackpot.

FIG. 6 is a flow chart illustrating the steps involved in funding the Bad Beat progressive jackpot. As previously described, a participating player in any instance of the multiplayer poker game utilises the GUI 100 to effect any playing decisions required during the progress of the game. If the player wishes to be eligible for the Bad Beat progressive jackpot, the player is required to toggle icon 112 on the GUI 100 to the BAD BEAT ON state. Funding of the Bad Beat progressive jackpot is achieved as follows:

The default state of a player's Bad Beat icon 112 at the commencement of a playing session is the BAD BEAT OFF state, as shown in step 600.

The gaming server 22 deems any player whose Bad Beat icon 112 is in the BAD BEAT ON state at the commencement of any turn of the multiplayer game to be eligible for the Bad Beat progressive jackpot, as indicated at step 606.

Any player whose Bad Beat token account balance 602 is zero is ineligible for the Bad Beat progressive jackpot. In such circumstances the client process (not shown) automatically sets the player's Bad Beat icon 112 to the BAD BEAT OFF state (at step 604) and prevents the player from toggling the icon 112 to the BAD BEAT ON state by greying out the Bad Beat icon 112 (at step 608), for example, until that player's Bad Beat token balance is positive, which the player can achieve by purchasing one or more Bad Beat tokens as described above.

At step 610 the Bad Beat token balance of every player whose Bad Beat icon 112 is in the BAD BEAT ON state at the commencement of the turn of the game, is decremented by 1.

As any player's Bad Beat token balance is decremented, the balance of the Bad Beat accumulation account is incremented 612 by an amount equal to the cost of a Bad Beat token, namely US$0.25, and the clearing account of an online casino website (3*a*, 3*b*) associated with the player is debited by the same amount, namely US$0.25.

According to this method of funding the Bad Beat progressive jackpot, a player "consumes" a Bad Beat token for each hand of multiplayer poker in which the player is eligible for the Bad Beat progressive jackpot. For each Bad Beat token that is so consumed, the Bad Beat progressive jackpot increments by an amount equal to the cost of the Bad Beat token. The player will continue to be eligible for the Bad Beat progressive jackpot (e.g., when playing a subsequent hand of poker 614) until the player toggles the Bad Beat icon 112 to the BAD BEAT OFF state, or until the player runs out of Bad Beat tokens, whichever occurs first.

It is envisaged that the player is able to redeem any unused Bad Beat tokens for monetary value in a similar manner to that by which the player is able to redeem credit from the player's own credit account.

Figure 7:
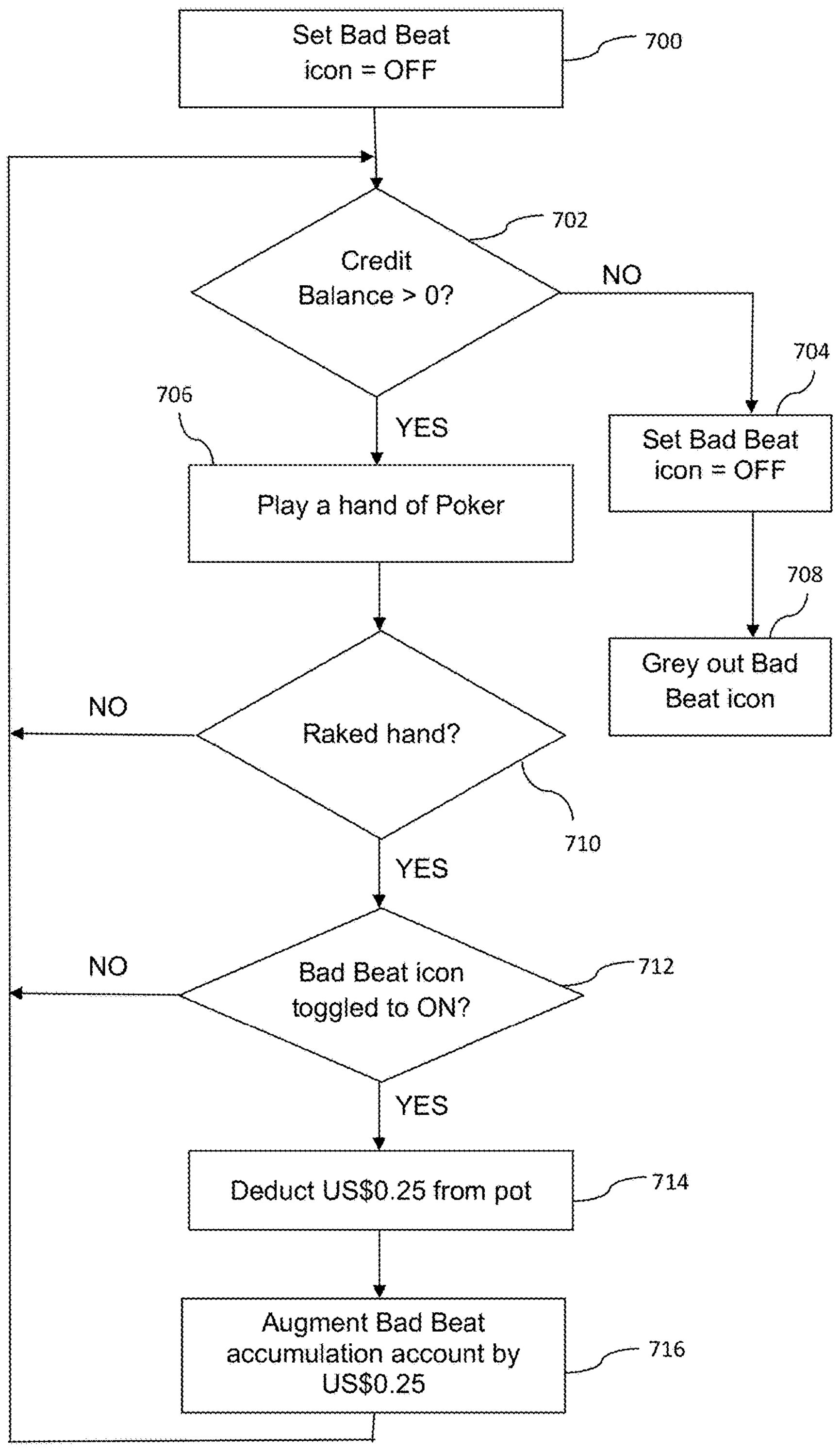
FIG. 7 is a flow chart of the steps involved in an alternative method of funding the Bad Beat progressive jackpot.

FIG. 7 is a flow chart illustrating the steps involved in an alternative embodiment for funding the Bad Beat progressive jackpot. A participating player in any instance of the multiplayer poker game utilises the GUI 100 to toggle icon 112 to the BAD BEAT ON state if the player wishes to be eligible for the Bad Beat progressive jackpot. In this alternative embodiment, funding of the Bad Beat progressive jackpot is achieved as follows:

The default state of a player's Bad Beat icon 112 at the commencement of a playing session is the BAD BEAT OFF state, as shown at step 700.

If the player's credit balance is zero or less 702, the bad Beat icon 112 is toggled to OFF 704 and greyed out 708.

The gaming server 22 deems any player whose Bad Beat icon 112 is in the BAD BEAT ON state at the commencement of any turn of the multiplayer game to be eligible for the Bad Beat progressive jackpot, as indicated at step 706.

If the turn of the multiplayer poker game is a raked hand 710 (i.e. a hand in which a rake is deducted from the pot) and the Bad Beat icon 112 is toggled to ON 712, a further sum, US$0.25 for example, is deducted from the pot 714 as a contribution to the Bad Beat accumulation account 716. If the turn of the game is not a raked hand (i.e. where no flop cards are dealt in the hand) no deduction is made from the pot as a contribution to the Bad Beat progressive jackpot.

In this alternative method of funding the Bad Beat progressive jackpot, a player's credit account has only a single account balance, namely a credit balance. The player will continue to be eligible for the Bad Beat progressive jackpot until the player toggles the Bad Beat icon 112 to the BAD BEAT OFF state, or until the player runs out of credit, whichever occurs first.

5. Apportionment of the Bad Beat Progressive Jackpot

In order to detect the occurrence of a Bad Beat event in any instance of the multiplayer poker game, the gaming server 22 continuously monitors the outcome of each instance of the game. When the gaming server 22 detects that a Bad Beat event has occurred in an instance the game, the gaming server transmits a notification of the event to the computing devices of all participating players whose Bad Beat icon 112 is in the BAD BEAT ON state, as well as to the administration server 32.

When the administration server 32 receives a notification message from the gaming server 22 that the Bad Beat event has occurred, the administration server apportions the Bad Beat progressive jackpot to the winning player or players by performing the following steps:

The administration server 32 identifies all the players participating in the turn of the instance of the game and whose Bad Beat icon 112 was in the BAD BEAT ON state at the commencement of the turn. These are the only players who are eligible to receive any portion of the Bad Beat progressive jackpot. All other players are ineligible.

If the player with the Bad Beat is eligible, the administration server 32 credits the clearing account of the online casino website 3*a*, 3*b* associated with that particular player with 50% of the Bad Beat progressive jackpot prize at the time the Bad Beat event occurred.

If the player who won the run of the instance of the game in which the Bad Beat event occurred is eligible, the administration server 32 credits the clearing account of the online casino website 3*a*, 3*b* associated with that particular player with 25% of the progressive jackpot prize at the time the Bad Beat event occurred.

the administration server 32 then determines the number of participating players that qualify (i.e. players who participated actively in the hand in which the Bad Beat event occurred). A player is deemed to qualify if that player did not fold before the flop cards were dealt in a game of stud poker, or did not fold before replacement cards were drawn in a game of draw poker. The administration server 32 computes the progressive jackpot share per qualifying player as the remainder (i.e. 25%) of the Bad Beat progressive jackpot divided by the number of qualifying players.

If any qualifying player is also eligible, the administration server 32 credits the clearing account of the online casino website 3*a*, 3*b* associated that particular player with an amount equal to a qualifying player's progressive jackpot share.

The administration server 32 decrements the balance of the Bad Beat accumulation account by all amounts credited to the clearing accounts of the online casino websites of all players that have won a portion of the Bad Beat progressive jackpot in the turn of the instance of the game in which the Bad Beat event occurred.

The administration server 23 also notifies the online casino websites 3*a*, 3*b* associated with all the players that have won a portion of the Bad Beat progressive jackpot, and each website credits the individual player's credit account by an amount equal to the portion of the Bad Beat progressive jackpot won by that player.

In an alternative embodiment, the Bad Beat progressive jackpot is apportioned differently, as follows:

50% of the progressive jackpot to the player with the Bad Beat.

25% of the progressive jackpot to the player with the winning hand.

25% in equal measure to all other players, in all instances of the game, whose Bad Beat icons 112 were in the BAD BEAT ON state at the time the Bad Beat event occurred.

When a Bad Beat event occurs, this alternative embodiment provides for the progressive jackpot to be divided among a larger pool of players, albeit with the probability of a smaller share of the progressive jackpot. This means that more players participate in a Bad Beat event, which stimulates interest in participating in the Bad Beat progressive jackpot which, in turn, leads to bigger progressive jackpots.

It will be appreciated that the entire Bad Beat progressive jackpot is not necessarily won whenever a Bad Beat event occurs. In particular, one or more of the players with the Bad Beat, the player that won the turn of the instance of the game and one or more qualifying players may not be eligible (that is, their respective Bad Beat icons 112 were in the BAD BEAT OFF state at the commencement of the turn of the game).

In order to stimulate player interest, it is desirable that the Bad Beat progressive jackpot is never less than a predetermined base amount. Thus, after a Bad Beat event has occurred and the administration server 32 apportions the Bad Beat progressive jackpot as described in steps 1 to 7 above, the progressive jackpot is reset to an amount that is equal to or greater than the predetermined base amount. In cases where the total amount of the Bad Beat jackpot apportioned by the administration server 32 to winning and eligible players would cause the jackpot to fall below the predetermined base amount, the shortfall is funded by means of a loan from an operator of the gaming server 22. From time to time, whenever such a loan is in existence, the monetary value of Bad Beat tokens consumed by participating players is first offset against the loan until the loan is extinguished, whereafter the monetary value of consumed Bad Beat tokens is used to increment the Bad Beat jackpot as previously described. It is also desirable for the Bad Beat progressive jackpot to be seen to be incrementing at all times, even while the loan is in existence. In order to produce this effect, the administration server 32 makes small regular increments to the Bad Beat accumulation account even while the loan is being offset (necessitating corresponding small increments to the loan account in order to compensate). In order to ensure that the loan is eventually extinguished, such increments made by the administration server 32 to the Bad Beat accumulation account must occur at an average rate that is less than the average rate at which Bad Beat tokens are consumed by participating players in all instances of the game.

It will be appreciated by those skilled in the art that the system 20 provides a facility that allows players to be eligible for a Bad Beat progressive jackpot without requiring dedicated Bad Beat tables at which each player is eligible for the Bad Beat jackpot. That is, the system 20 allows players to individually opt-in and opt-out at will to the Bad Beat progressive jackpot whilst seated at any table in an online poker room. Prior art systems have a limited number of such tables that are reserved for Bad Beat players and the number of such dedicated tables in operation at any time is a function of player demand, with additional dedicated tables being opened in periods of high player demand and active tables being consolidated in periods where player demand is slack. As far as the applicant is aware, management of the number of Bad Beat tables in operation from time to time is performed manually, which is unnecessarily complicated.

6. Conclusion

While a number of example aspects and embodiments have been discussed above, those of skill in the art will recognize certain modifications, permutations, additions and sub-combinations thereof are present in the disclosure. Furthermore, other variations from the disclosed embodiments may be made without departure from the scope of the invention. All questions concerning scope are to be answered by reference to the appended claims.

What is claimed is:

1. A computer-implemented method performed by a server device configured to simultaneously conduct multiple hands of poker with a plurality of client devices via a wide-area network, the computer-implemented method comprising:

receiving, from a client device of the plurality of client devices, an opt-in request to a bad beat feature of a hand of poker of the multiple hands of poker, wherein the opt-in request is generated in response to the client device receiving an opt-in indication by way of an input mechanism of the client device;

during the hand of poker, (i) receiving, from the client device, instructions for playing the hand of poker, wherein the instructions are generated by way of the input mechanism of the client device, and (ii) determining that the hand of poker is subject to a bad beat event, wherein the client device displays, by way of a display screen of the client device, events of the hand of poker; and based on the hand of poker being subject to the bad beat event and the client device opting-in to the bad beat feature, apportioning part of the bad beat progressive jackpot to the client device and a remaining portion of the bad beat progressive jackpot to one or more of the plurality of client devices involved in different hands of poker of the multiple hands of poker that opted-in to the bad beat feature, wherein the client device displays, by way of the display screen, the part of the bad beat progressive jackpot apportioned to the client device.

2. The computer-implemented method of claim 1, wherein the server device has access to a credit balance of the client device and a separate bad beat token balance of the client device, the computer-implemented method further comprising:

in response to receiving the opt-in request, decreasing the bad beat token balance of the client device by an amount and increasing the bad beat progressive jackpot by at least part of the amount.

3. The computer-implemented method of claim 2, further comprising:

decreasing the credit balance by a wager of the client device, wherein apportioning part of the bad beat progressive jackpot to the client device comprises apportioning the part of the bad beat progressive jackpot to the credit balance.

4. The computer-implemented method of claim 1, wherein apportioning part of the bad beat progressive jackpot to the client device comprises:

determining that the client device is subject to the bad beat event; and in response to determining that the client device is subject to the bad beat event, apportioning more of the bad beat progressive jackpot to the client device than to any other client device that participated in the multiple hands of poker.

5. The computer-implemented method of claim 4, wherein the client device is apportioned at least half of the bad beat progressive jackpot.

6. The computer-implemented method of claim 1, wherein apportioning part of the bad beat progressive jackpot to the client device comprises:

determining that the client device won the hand of poker; and in response to determining that the client device won the hand of poker, apportioning less of the bad beat progressive jackpot to the client device than to another client device that was subject to the bad beat event, but more of the bad beat progressive jackpot to the client device than to any additional client device.

7. The computer-implemented method of claim 6, wherein the client device is apportioned at least one quarter of the bad beat progressive jackpot.

8. The computer-implemented method of claim 1, wherein apportioning part of the bad beat progressive jackpot to the client device comprises:

determining that the client device is not subject to the bad beat event and that the client device did not win the hand of poker; and in response to determining that the client device is not subject to the bad beat event and that the client device did not win the hand of poker, apportioning a share of the bad beat progressive jackpot equally between the client device and other client devices that are not subject to the bad beat event and did not win the hand of poker.

9. The computer-implemented method of claim 8, wherein the share of the bad beat progressive jackpot is one quarter or less of the bad beat progressive jackpot.

10. The computer-implemented method of claim 1, wherein the bad beat event is triggered by a particular client device participating in the hand of poker losing the hand of poker despite having cards that provide the particular client device with a significant likelihood of winning the hand of poker.

11. The computer-implemented method of claim 1, wherein the bad beat event is triggered by a particular client device participating in the hand of poker losing the hand of poker despite having four of a kind or a straight flush.

12. The computer-implemented method of claim 1, wherein the hand of poker takes place at a virtual poker table, the computer-implemented method further comprising:

conducting, by the server device, a second hand of poker with the client device, wherein the client device does not opt-in to the bad beat feature for the second hand of poker, and wherein the second hand of poker also takes place at the virtual poker table.

13. The computer-implemented method of claim 1, wherein at least one client device participating in the hand of poker did not opt-in to the bad beat feature and is not apportioned any of the bad beat progressive jackpot.

14. A computer-implemented method performed by a client device, wherein the client device includes an input mechanism and a display screen, the computer-implemented method comprising:

receiving, by way of the input mechanism, an opt-in indication to a bad beat feature of a hand of poker, wherein the hand of poker is one of multiple hands of poker simultaneously conducted by a server device, via a wide-area network, for a plurality of client devices;

in response to receiving the opt-in indication, transmitting, to the server device, an opt-in request to the bad beat feature;

during the hand of poker, receiving, from the server device, an indication that the hand of poker is subject to a bad beat event, wherein the client device displays, by way of the display screen, events of the hand of poker; and receiving, from the server device, an apportionment of part of a bad beat progressive jackpot, wherein the server device apportions a remaining portion of the bad beat progressive jackpot to one or more of the plurality of client devices involved in different hands of poker of the multiple hands of poker that opted-in to the bad beat feature, wherein the client device displays, by way of the display screen, the part of the bad beat progressive jackpot apportioned to the client device.

15. The computer-implemented method of claim 14, wherein the client device is subject to the bad beat event, and wherein, based on the client device being subject to the bad beat event, the client device is apportioned more of the bad beat progressive jackpot than any other client device that participated in the multiple hands of poker.

16. The computer-implemented method of claim 14, wherein the client device won the hand of poker, and wherein, based on the client device winning the hand of poker, the client device is apportioned less of the bad beat progressive jackpot than another client device that was subject to the bad beat event, but more of the bad beat progressive jackpot than any additional client device that opted-in to the bad beat feature.

17. The computer-implemented method of claim 14, wherein the client device is not subject to the bad beat event and the client device did not win the hand of poker, and wherein, based on the client device not being subject to the bad beat event and the client device not winning the hand of poker, apportioning a share of the bad beat progressive jackpot equally between the client device and other client devices that are not subject to the bad beat event and did not win the hand of poker.

18. The computer-implemented method of claim 14, wherein the bad beat event is triggered by a particular client device participating in the hand of poker losing the hand of poker despite having cards that provide the particular client device with a significant likelihood of winning the hand of poker.

19. The computer-implemented method of claim 14, wherein the bad beat event is triggered by a particular client device participating in the hand of poker losing the hand of poker despite having four of a kind or a straight flush.

20. An article of manufacture including a non-transitory computer-readable medium, having stored thereon program instructions that, upon execution by a server device configured to simultaneously conduct multiple hands of poker with a plurality of client devices via a wide-area network, cause the server device to perform operations comprising:

receiving, from a client device of the plurality of client devices, an opt-in request to a bad beat feature of a hand of poker of the multiple hands of poker, wherein the opt-in request is generated in response to the client device receiving an opt-in indication by way of an input mechanism of the client device;

during the hand of poker, (i) receiving, from the client device, instructions for playing the hand of poker, wherein the instructions are generated by way of the input mechanism of the client device, and (ii) determining that the hand of poker is subject to a bad beat event, wherein the client device displays, by way of a display screen of the client device, events of the hand of poker; and based on the hand of poker being subject to the bad beat event and the client device opting-in to the bad beat feature, apportioning part of the bad beat progressive jackpot to the client device and a remaining portion of the bad beat progressive jackpot to one or more of the plurality of client devices involved in different hands of poker of the multiple hands of poker that opted-in to the bad beat feature, wherein the client device displays, by way of the display screen, the part of the bad beat progressive jackpot apportioned to the client device.

* * * * *